United States Patent
Wang et al.

(10) Patent No.: US 9,867,039 B2
(45) Date of Patent: Jan. 9, 2018

(54) SYSTEM AND METHOD FOR FAKED BASE STATION DETECTION

(71) Applicant: Futurewei Technologies, Inc., Plano, TX (US)

(72) Inventors: Zhibi Wang, Woodridge, IL (US); Jianying Qian, Shenzhen (CN); Ahmad Shawky Muhanna, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/188,803

(22) Filed: Jun. 21, 2016

(65) Prior Publication Data

US 2016/0381545 A1 Dec. 29, 2016

Related U.S. Application Data

(60) Provisional application No. 62/185,348, filed on Jun. 26, 2015.

(51) Int. Cl.
*H04M 1/66* (2006.01)
*H04W 12/00* (2009.01)
(Continued)

(52) U.S. Cl.
CPC ............ *H04W 12/00* (2013.01); *H04W 60/04* (2013.01); *H04W 88/08* (2013.01)

(58) Field of Classification Search
CPC ..... H04W 12/12; H04W 12/06; H04W 48/16; H04W 12/10; H04W 24/08; H04W 48/20; H04W 40/246; H04L 63/107
See application file for complete search history.

(56) References Cited

U.S. PATENT DOCUMENTS 7,346,593 B2 3/2008 Takeuchi et al.
7,353,214 B2 4/2008 Yamanishi et al.
(Continued)

FOREIGN PATENT DOCUMENTS

CN 104125571 A 10/2014
CN 104270762 A 1/2015
(Continued)

OTHER PUBLICATIONS

Patcha, A., et al., "An Overview of Anomaly Detection Techniques: Existing Solutions and Latest Technological Trends," Computer Networks Feb. 2007, 25 pages.

*Primary Examiner* — Ronald Eisner
(74) *Attorney, Agent, or Firm* — Slater Matsil, LLP

(57) ABSTRACT

A system and method of detecting fake base stations. A first wireless device such as a user equipment (UE) or a base station (BS) may identify multiple parameters associated with a discovery signal transmitted by a second wireless device, the second wireless device advertising as a BS. The first wireless device may compare the multiple parameters with a set of parameters assigned to, or otherwise associated with, a cluster of neighboring BSs, and determine that the second wireless device is a fake BS when an inconsistency between the multiple parameters and the set of parameters associated with the cluster of neighboring BSs exceeds a threshold. The UE or the BS may also transmit the multiple parameters to a central controller, and the central controller may aggregate, correlate, and analyze the parameters, historical data, and other data from other sources associated with the second wireless device to determine whether the second wireless device is a fake BS.

24 Claims, 7 Drawing Sheets

(51) Int. Cl.
*H04W 88/08* (2009.01)
*H04W 60/04* (2009.01)

(56) References Cited

U.S. PATENT DOCUMENTS

| | | |
|---|---|---|
| 8,006,157 B2 | 8/2011 | Abe et al. |
| 2015/0085838 A1* | 3/2015 | Benjebbour .......... H04W 16/28 370/336 |
| 2015/0271194 A1* | 9/2015 | Szucs ................. H04L 63/0869 726/23 |

FOREIGN PATENT DOCUMENTS

| | | |
|---|---|---|
| CN | 104301894 A | 1/2015 |
| WO | 2014056538 A4 | 4/2014 |

\* cited by examiner

▼ cell-identifier
    spare4:0x0  (0)
    cell-identification-discriminator:cgi-be-used-to-identify-cell  (0)
    ▼ cell-identification-0
        mcc-digit-2:0x6  (6)
        mcc-digit-1:0x4  (4)
        mnc-digit-3:0xf  (15)
        mcc-digit-3:0x0  (0)
        mnc-digit-2:0x0  (0)
        mnc-digit-1:0x0  (0)
        lac:24          NEW CELL LAC ID
        lac-cont:64
        ci-value:8F
        ci-value-cont:B9

▼ layer3-information
    protocol-discriminator:nm-layer-message  (5)
    skip-indicator:0x0  (0)
    ▼ choice-by-protocol-discriminator
        ▼ nm-layer-nessage
            sequence-number:0x0  (0)
            ▼ nn-messenger-choice ▼ registration-messages
                    ▼ registration-msg ▼ location-updating-request
                            ▼ ciphering-key-sequence-number
                                spare1:0x0  (0)
                                key-sequence:values-0  (0)
                          ▼ location-updating-type
                                for:no-follow-on-request-pending  (0)
                                spare:0x0  (0)
                                lut:normal-location-updating  (0)
                          ▼ location-area-identification
                                mcc-digit-2:0x6  (6)
                                mcc-digit-1:0x4  (4)
                                mnc-digit-3:0xf  (15)
                                mcc-digit-3:0x0  (0)
                                mnc-digit-2:0x0  (0)
                                mnc-digit-1:0x0  (0)     SOURCE CELL LAC ID
                                lac:27
                                lac-cont:73

FIG. 3

SYSTEM AND METHOD FOR FAKED BASE STATION DETECTION

This patent application claims priority to U.S. Provisional Application No. 62/185,348, filed on Jun. 26, 2015 and entitled "System and Method for Faked Base Station Detection," which is hereby incorporated by reference herein as if reproduced in its entirety.

TECHNICAL FIELD

The present invention relates generally to managing the allocation of resources in a network, and in particular embodiments, to techniques and mechanisms for a method and system for fake base station detection.

BACKGROUND

Fake base stations (BSs) have been used to launch many attacks on wireless communication systems, such as sending out spoofing and phishing short message service (SMS) messages, catching mobile user's device identity, or launching man-in-the-middle tacks against the mobile users. In the phishing SMS message case, innocent users are often deluded to act based on the fake information. The consequences are financial loss of end users, bad user experience to the operators, media exposure, and sometime social disturbance.

SUMMARY OF THE INVENTION

Technical advantages are generally achieved, by embodiments of this disclosure which describe a method and system for fake base station detection.

In accordance with an embodiment, a method for detecting fake base stations is provided, as may be performed by a first wireless device such as a base station or a user equipment. In this example, the method includes identifying multiple parameters associated with a discovery signal transmitted by a second wireless device, the second wireless device advertising as a base station controller (BS). The method further includes comparing the multiple parameters associated with the discovery signal transmitted by the second wireless device with a set of parameters assigned to, or otherwise associated with, a cluster of neighboring BSs. The method further includes determining that the second wireless device is a fake BS when an inconsistency between the parameters associated with the discovery signal transmitted by the second wireless device and the set of parameters assigned to, or otherwise associated with, the cluster of neighboring BSs exceeds a threshold. An apparatus for performing this method is also provided.

In accordance with another embodiment, a method for detecting fake base stations is provided, as may be performed by a first wireless device such as a base station or a user equipment. In this example, the method includes detecting a discovery signal of a second wireless device, the second wireless device advertising as a base station controller (BSC). The method further includes determining a power threshold and a minimum lifetime duration assigned to, or otherwise associated with, a cluster of neighboring BSCs. The method further includes determining that the second wireless device is a faked base station when both a received power level of the discovery signal exceeds the power threshold and a lifetime of the discovery signal fails to exceed the minimum lifetime duration, the lifetime of the discovery signal corresponding to a period of time for which the discovery signal is capable of being detected by the first wireless device.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates a diagram of an embodiment fake base station detection mechanism;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
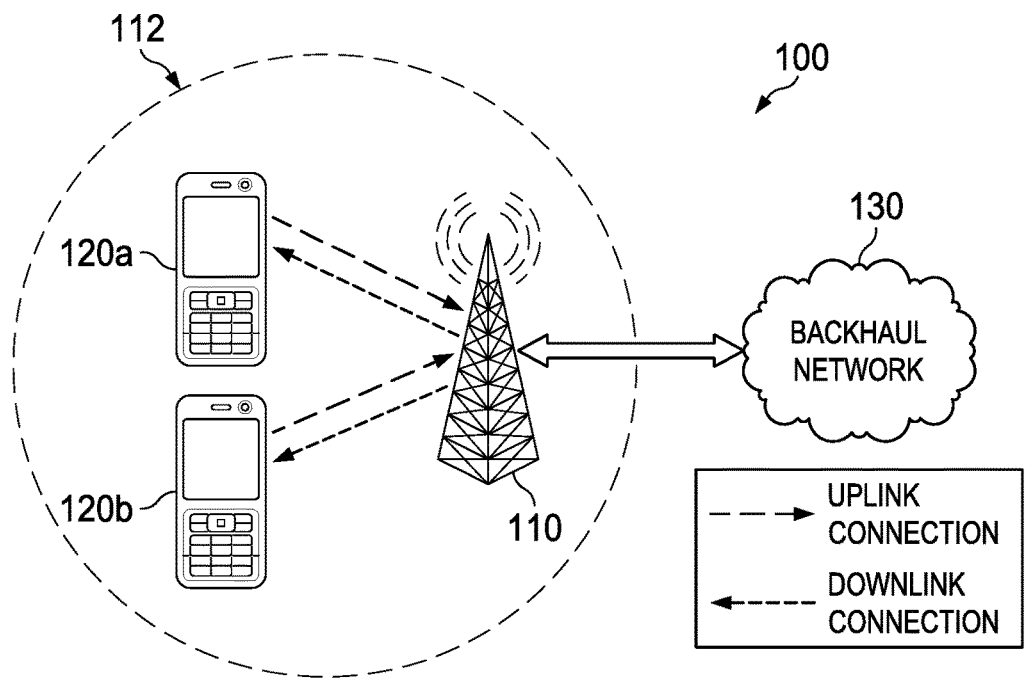
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The Global System for Mobile Communications (GSM) specification requires a handset to authenticate to the network, but does not require the mobile device to authenticate the network. This well-known security hole is exploited by the fake base station (BS), which masquerades as a base station. It may allow the fake BS to force the mobile phone connected to it to use no call encryption (e.g., A5/o mode) or to use easily breakable encryption (e.g., A5/1 or A5/2 mode), making the call data easy to intercept and convert to audio. The fake BS may also send a large volume of spoofing short message service (SMS) messages to trick the end user into believing the messages came from an authenticated party.

There are current proposals and methods to locate fake base stations, but quite often there are many issues such as lack of capability to accurately detect and locate the fake base station in a timely fashion. In addition, some of the current approaches are difficult to implement. For example, a fake base station detection device may determine that a wireless device is a fake base station when only a discovery signal from the wireless device of a very short duration is detected. In fact, the discovery signal may be sent from a base station when the fake base station detection device travels with a relatively high speed and are handed over from one base station to another base station pretty often. Hence, new mechanisms for fake base station detection are desired.

Disclosed herein is an embodiment fake station detection system and method for a cellular system. A first wireless device may identify multiple parameters associated with a discovery signal transmitted by a second wireless device while the second wireless device advertises as a base station (BS). The first wireless device may compare the multiple parameters associated with the discovery signal with a set of parameters assigned to, or otherwise associated with, a cluster of neighboring BSs. The first wireless device may further determine that the second wireless device is a fake BS when an inconsistency between the parameters associated with the discovery signal transmitted by the second wireless device and the set of parameters assigned to, or otherwise associated with, the cluster of neighboring BSs exceeds a threshold. The parameters may be collected from a wide range of sources.

Intelligence analytics and machine learning technologies may be used to process a large volume of unstructured data in real time and correlate information from different sources. An embodiment system and method may maximize the usage of existing information and historical information and predict and detect a fake base station in a timely fashion. For instance, it may accurately determine the location and path of a moving fake BS, e.g., a vehicle carrying the fake BS, based on current collected data, historical data and trends of the fake BS.

The fake BS detection system and method may be used by an operator to detect and predict a fake BS, and to increase the end user quality of experience (QoE) or to reduce customer churn. This may also help to pinpoint criminal activities based on the fake BS. These and other aspects are disclosed in greater detail below.

FIG. 1 illustrates a network 100 for communicating data. The network 100 comprises a base station no having a coverage area 112, a plurality of mobile devices 120 (120a, 120b), and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a mobile station (MS), a user equipment (UE), a mobile station (STA), and other wirelessly enabled devices. The terms "mobile station" and "user equipment" are used interchangeably throughout this disclosure. In some embodiments, the network 100 may comprise various other wireless devices, such as relays, low power nodes, etc.

Figure 2:
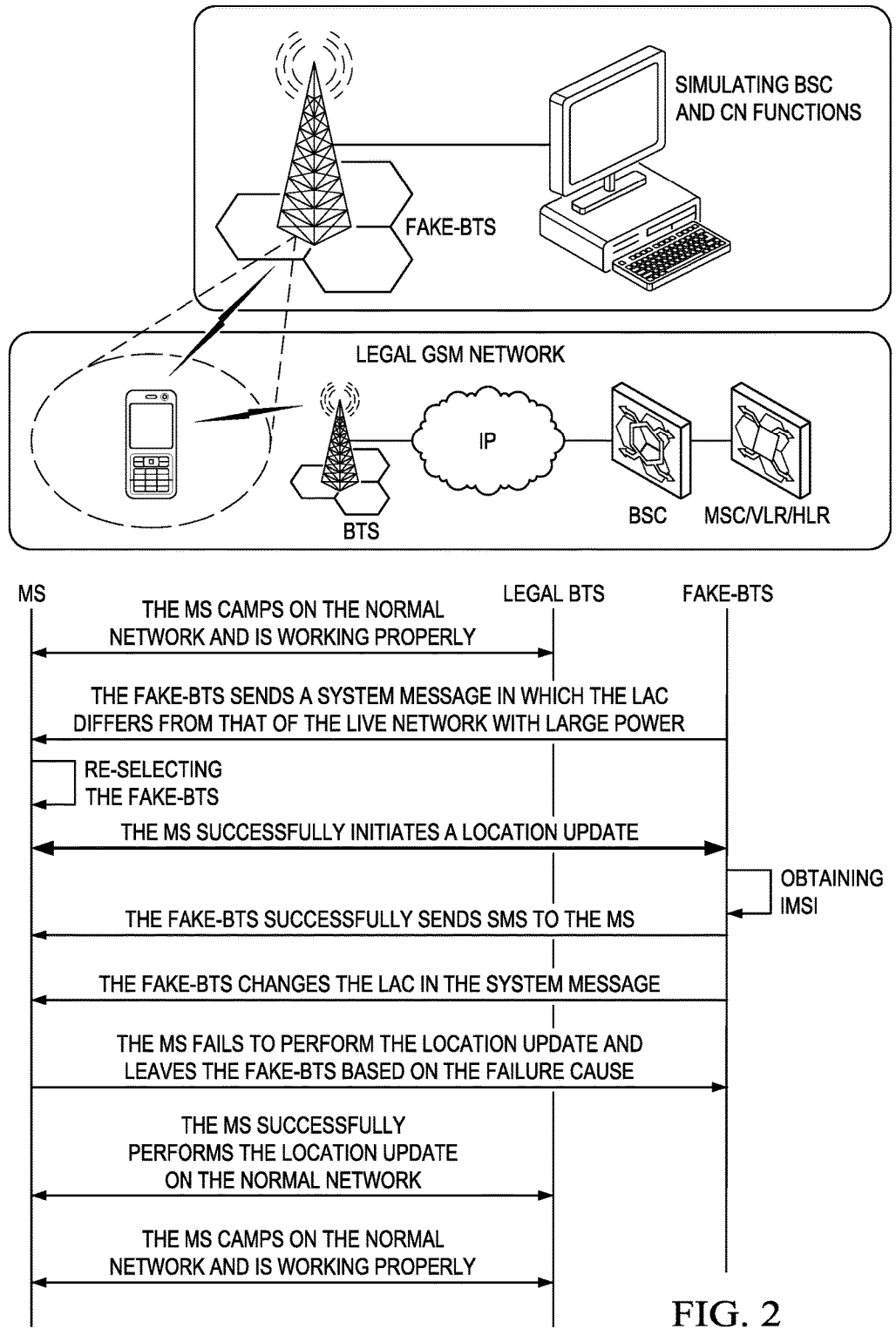
FIG. 2 illustrates a flowchart of a conventional fake base station attack.

FIG. 2 illustrates a working principle of a fake-base transceiver station (BTS) SMS system. Other types of fake BTS are also possible. The fake-BTS increases the transmit power to enable the mobile station (MS) to reselect a cell served by the fake-BTS and intercepts the MS international mobile subscriber identity (IMSI)/temporary mobile subscriber identity (TMSI) using the location update signaling to send junk short messages.

An example fake-BTS working process is as follows:
1. The fake-BTS transmits signals with large power.
2. The MS re-selects a cell served by the fake-BTS.
3. The fake-BTS sends a system message, in which the location area code (LAC) identity (ID) differs from that of the legitimate network.
4. The MS sends a location update request to the fake-BTS for the first time.
5. The fake-BTS obtains the MS IMSI.
6. The fake-BTS sends junk short messages to the MS.
7. The fake-BTS sends a system message again, in which the LAC ID is changed.
8. The MS sends a location update request again to the fake-BTS.
9. The fake-BTS refuses the location update request.
10. The MS re-selects the legitimate network.
11. The MS initiates the location update in the legitimate network.

Intelligence and machine learning technologies may be utilized to analyze data collected from different sources to detect and locate a fake base station. Intelligence analytics generally is the process of examining large sets of different types of data to uncover hidden patterns, previously unknown correlations and other useful information that can be used to make more informed and better decisions. Intelligence analytics uses predictive analytics or other advanced methods to extract valuable information from data collected from different sources with different formats. Analysis of data sets may find new correlations to combat crime such as a fake base station. The analysis can be based on different technologies including genetic algorithms, machine learning, natural language processing, signal processing, simulation, time series analysis, and visualization.

Machine learning (ML) is the science of building systems that automatically learn from data. ML is a data-driven approach to problem solving, in which the hidden patterns and trends present within data are first detected and then leveraged to help make better decisions. This process of automatically learning from data and in turn using that acquired knowledge to inform future decisions is very beneficial.

In an embodiment, intelligence analytics is used to detect and predict the fake base station with information collected from many sources, including information from the operator's network, operation center customer feedback, mobiles that have a fake BS detection application, short message service center (SMSC) logs, signaling information, and historical data, and correlate collected information with machine learning technology to detect the fake base station. For example, at the cell level, it may be examined whether there are a large number of abnormal location updates in the past short period and in an exceptional proportion. A mobile application that detects an abnormal BS also may report, e.g., detecting time, its location, the fake BS cell ID, and signal strength to the system for correlation analysis.

Specifically, intelligence analytics may be used on the information collected from one or more of (1) a potential victim's mobile station (time, signaling strength, user equipment (UE) location, international mobile station equipment identity (IMEI)/IMSI/mobile directory number (MDN), fake BS cell ID, LAC, etc.; (2) operator's network (location area update (LAU) with Location Area Code that the fake BS uses, frequency of abnormal LAU, MS that performs frequent abnormal LAU); (3) customer care center (complaint and information from the fake BS); (4) fake BS signaling strength and its surrounding environment reported by the mobile network (narrow band noise, strength); and (5) history of fake BS information. In an embodiment, all the information collected are used and correlated by the intelligence analytics at the same time to improve the detection accuracy. It should be noted that the different information listed herein are just examples, and there are other general and specific information that can be used in the machine learning than listed herein.

For instance, one type of information is the LAC ID of the fake-BS included in the location update message after the MS leaves the fake-BS cell and reselects a legitimate network, as shown in FIG. 3. When the MS leaves the fake-BS cell and reselects a legitimate network, the MS sends the LOCATION UPDATE REQUEST message, in which the LAC ID is that of the cell that the MS camps on before the reselection. Therefore, a check can be made of whether the LAC ID is consistent with the network configuration to determine whether there are fake-BSs around the cell.

Another type of information may be collected from test MSs of personnel that operate fake-BSs, which frequently perform location updates. Fake-BS operators may carry test MSs to check whether the fake-BSs successfully send junk messages. The test MSs may frequently perform a large number of location updates on legitimate networks when they are close to the fake-BS (abnormal LAC→normal LAC). If there are one or several MSs that frequently perform a large number of location updates in a short period, it may be inferred that there is a fake-BS nearby. If the fake-BS operator powers off the test MS, the location update messages may disappear. For example, after a period of time, the fake-BS operator thinks that the fake-BS is working properly and powers off the test MS. Disappearance of location update messages transmitted by one or more MSs a short period of time after a large number of location updates may also be included into the detection process of a fake BS.

Figure 4:
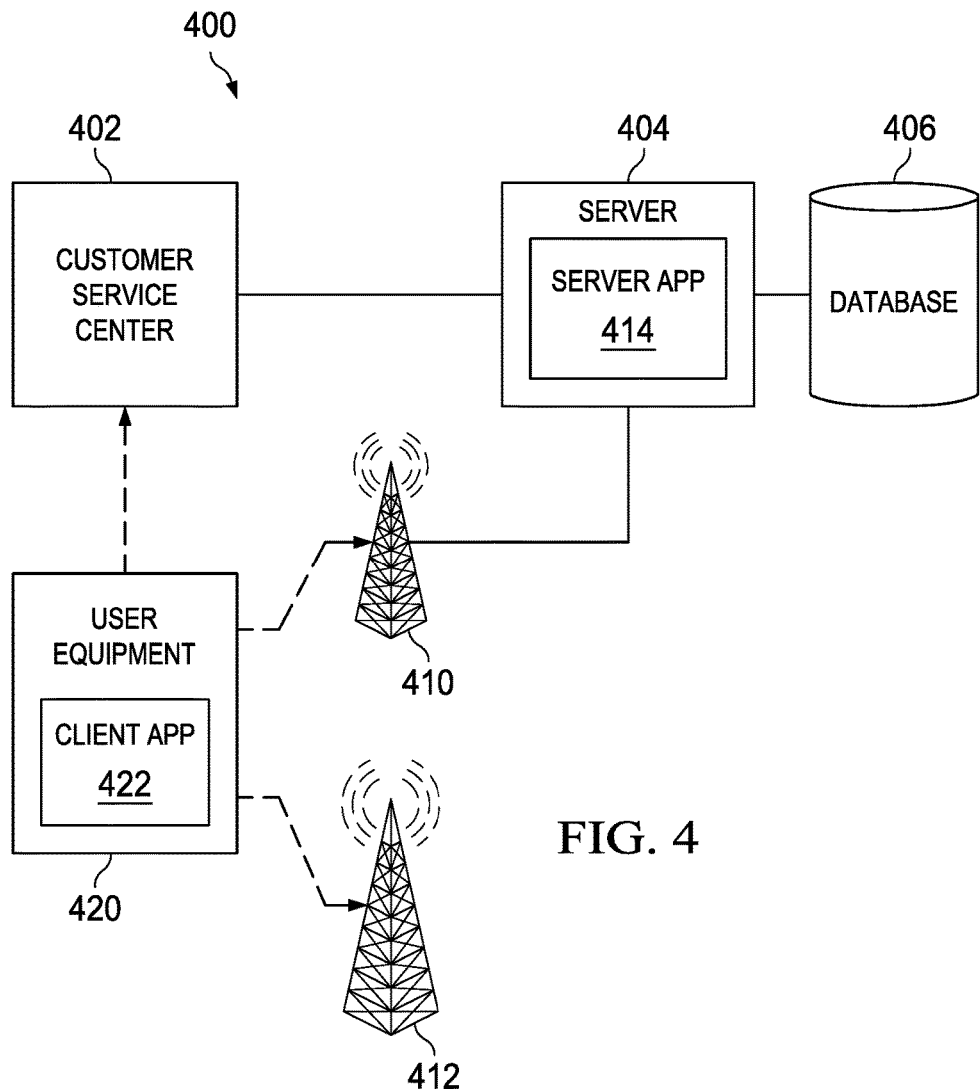
FIG. 4 illustrates a diagram of an embodiment fake base station detection system.

FIG. 4 illustrates an embodiment system 400 for fake base station detection. The system 400 comprises a base station 410, a fake base station 412, a plurality of UEs 420 (only one UE is shown for illustration purposes), a server 404, a customer service center 402, and a database 406. The server 404, the database 406, and/or the customer service center 402 may be maintained by a wireless communications service provider. The server 404 may be communicatively coupled to the database 406, the customer service center 402, and/or the base station 410. The server 404 or a server application 414 on the server 404 may collect data from a wide range of sources and perform analysis on the data for fake base station detection. The database 406 may store data collected from the wide range of sources. The collected data may be analyzed and correlations of different data may be determined. Normal behavior will be learned based on the parameters associated with the environment when the fake BS is absent. Certain thresholds may be defined to determine whether a potential BS is a fake BS.

The UE 420 or a client application 422 on the UE 420 may collect data of the cellular system and send the collected data to the server 404 for fake base station detection. The client application 422 may report directly to the server 404 or through a network side interface (not shown in FIG. 4). For example, the client application 422 may detect abnormalities based on an unusual location update, and then report to the network-side interface. The reported information may include one or more of MS ID (IMSI or TMSI), MS location, time, fake-BS ID, fake-BS signaling strength, etc.

Figure 5:
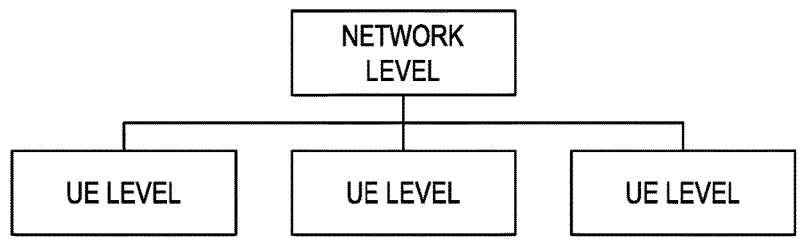
FIG. 5 illustrates a diagram of an embodiment hierarchy of a fake base station detection system.

In an embodiment, two levels of data analytics are used as shown in FIG. 5. On the UE level, all the information available to the same UE may be used and the determination of a fake BS may be real time. On the network level, information collected and historical data from all BSs and other resources may be used to correlate the information from different resources. The UE level may report the anomaly in real time to the network level. Upon receiving the anomaly report from any UE, the network level may correlate information from other sources and perform data analytics in real time.

Figure 6:
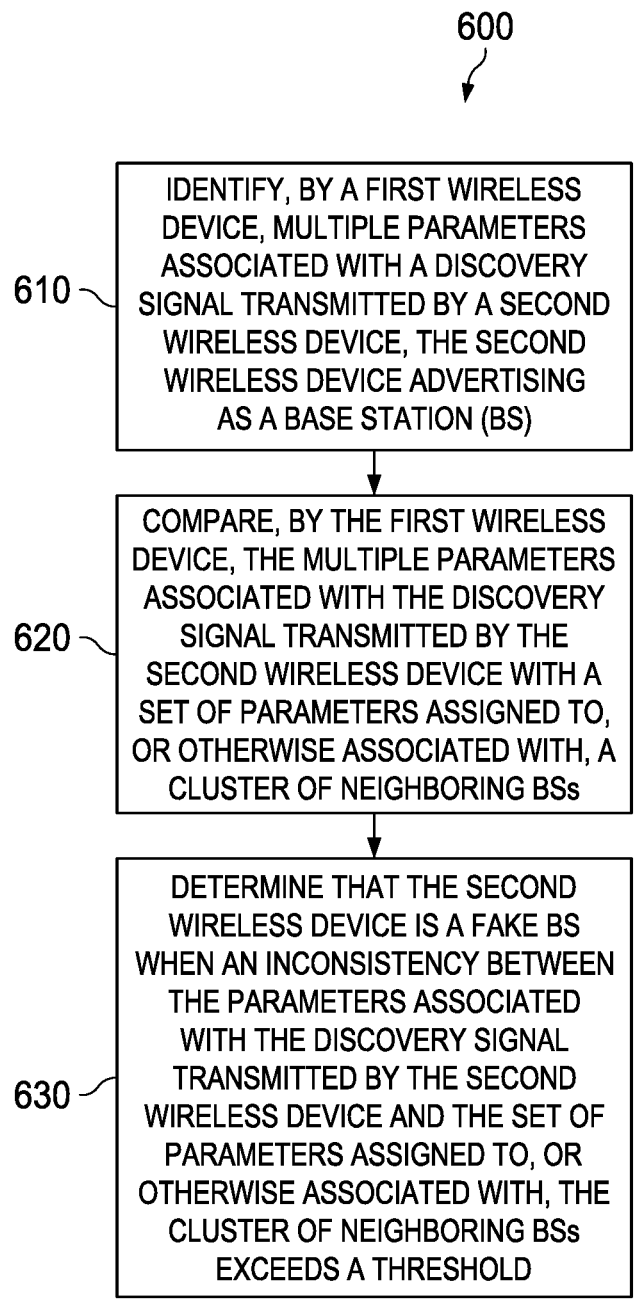
FIG. 6 illustrates a flowchart of an embodiment method for fake base station detection.

FIG. 6 illustrates an embodiment method 600 for detecting a fake base station, as may be performed by a wireless device such as a UE or a base station (BS). As shown, the method 600 begins at step 610, where multiple parameters associated with a discovery signal are identified by a first wireless device The parameters may include a cell identifier (CID), a Location Area Code (LAC), a received power level (e.g., a Reference Signal Received Power (RSRP) level), a duration for which the discovery signal is detectable (eg., a lifetime), an encryption level of the discovery signal, a service level (e.g., 3G, 4G, etc.) advertised by the discovery signal, a frequency over which the discovery signal is received, a set of base station capabilities advertised by the discovery signal, and/or other parameters. The discovery signal may be transmitted by a second wireless device, the second wireless device advertising as a base station (BS). The advertisement may be, for example, a beacon signal that is broadcast to notify nearby STAs that an AP is available to provide wireless access. Thereafter, the method 600 proceeds to step 620, where the multiple parameters associated with the discovery signal transmitted by the second wireless device are compared by the first wireless device with a set of parameters assigned to, or otherwise associated with, a cluster of neighboring BSs.

Subsequently, the method 600 proceeds to step 630, where it is determined that the second wireless device is a fake BS when an inconsistency between the parameters associated with the discovery signal transmitted by the second wireless device and the set of parameters assigned to, or otherwise associated with, the cluster of neighboring BSs satisfies a criteria.

For example, the first wireless device may identify an inconsistency when a frequency band over which the discovery signal is transmitted does not match any frequency band in a set of frequency bands assigned to the cluster of neighboring BSCs. As another example, the first wireless device may identify an inconsistency when a cell identifier (CID) of the second wireless device (as specified by the discovery signal) does not match any CID in a set of CIDs assigned to the cluster of neighboring BSCs. As another example, the first wireless device may identify an inconsistency when one or more BSC capabilities of the second wireless device (as specified by the discovery signal) are inconsistent with a set of BSC capabilities associated with the cluster of neighboring BSCs. This may occur the second wireless device lacks a BSC capability in the set of BSC capabilities associated with the cluster of neighboring BSCs. As yet another example, the first wireless device may identify an inconsistency when a network parameter identified in the discovery signal is inconsistent with a set of network parameters associated with the cluster of neighboring BSCs.

As yet another example, the first wireless device may identify an inconsistency when a noise level detected in the discovery signal exceeds a noise level of one or more signals transmitted by one or more BSCs in the cluster of neighboring BSCs by at least a threshold. This may occur when the discovery signal is jamming a frequency used by a legitimate base station.

As yet another example, the first wireless device may identify an inconsistency when a neighboring cell list included in the discovery signal is inconsistent with neighboring cell lists associated with the cluster of neighboring BSCs.

In yet another embodiment, the first wireless device may identify an inconsistency when the communications session advertised by the second wireless device is downgraded from a Universal Mobile Telecommunications System (UMTS) connection to a Global System for Mobile Communications (GSM) connection.

As yet another example, the first wireless device may identify an inconsistency when an encrypted communications session is downgraded to an unencrypted communications session or when a stronger encryption algorithm is downgraded to a weaker encryption algorithm. As yet another example, the first wireless device may identify an inconsistency when both a received power level of the discovery signal exceeds a power threshold and a lifetime of the discovery signal fails to exceed a minimum duration. The lifetime of the discovery signal may correspond to a period of time for which the discovery signal is capable of being detected by the first wireless device.

The power threshold and the minimum duration used to compare with the received power level and lifetime of the discovery signal may be a power threshold and a minimum lifetime duration assigned to, or otherwise associated with, the cluster of neighboring BSCs. It may be determined that the second wireless device is a fake base station when both the received power level of the discovery signal exceeds the power threshold and the lifetime of the discovery signal fails to exceed the minimum lifetime duration. On the other hand, it may be determined that the second wireless device is not a fake base station when either the received power level of the discovery signal fails to exceed the power threshold or the lifetime of the discovery signal exceeds the minimum lifetime duration. A control signal received from one of the cluster of neighboring BSCs may specify the power threshold and the minimum lifetime duration. For example, discovery signals of two or more BSCs in the cluster of neighboring BSCs may be detected by the first wireless device. The minimum lifetime duration may be determined according to lifetimes of the discovery signals, and the power threshold may be determined according to received signal power levels of the discovery signals from the wo or more BSCs in the cluster of neighboring BSCs.

In some embodiments, the criteria for which the inconsistency determination is based may be learned via machine learning from the environments when the second wireless device is absent. For example, the first wireless device may compare five parameters associated with the discovery signal and when four parameters out of the five parameters do not match corresponding parameters in the set of parameters associated with the cluster of neighboring BSs, the first wireless device may determine that the second wireless device is a fake BS.

In an embodiment, UEs may scan their neighborhood, e.g., for system information (SI) messages, to detect a suspicious BS. This includes SI messages may claim to be the operator but may use or announce frequencies outside of the licensed spectrum.

A mobile application in the UE, such as the client application 422 in FIG. 4, may scan nearby GSM cells and compare them with a crowd-sourced database for the current location. Any new (location area identity (LAI), cell ID) radio parameters that are configured differently than the claimed operator's standard (e.g., encryption level failing to meet minimum encryption requirement set forth in operator's standard, providing 3G service in a location where 4G service should be available, etc.), or temporary base stations may be flagged as potential fake BSs. The mobile app may send an alert with a measurement report to the network, and the measurement report may include time, signaling strength, UE location, IMEI/IMSI/MDN fake BS cell ID, LAC, etc. of the potential fake BS. The mobile application may detect a fake BS based on one or more of the following abnormal activities:

Suspicious cell configuration:
Encryption downgrade/no encryption,
High cell reselect offset,
Large number of paging groups,
Low registration timer,
Suspicious cell behavior:
Delayed Cipher Mode Complete acknowledgement,
Cipher Mode Complete message without IMEI software version (IMEISV),
ID requests during location update,
Paging without transaction,
Orphaned traffic channel.

When the first wireless device is a UE or a BS, the parameters associated with the discovery signal transmitted by the second wireless device may be sent by the first wireless device to a central controller, respectively. The central controller may analyze these parameters, historical data, and data collected from a wide range of sources regarding the second wireless device to determine whether the second wireless device is a fake BS.

For example, the determining process may comprise comparing a frequency band over which the discovery signal is transmitted with a set of frequency bands assigned to, or otherwise associated with, the cluster of neighboring BSs. The discovery signal may identify at least one of a location area code (LAC) or a cell identifier (CID), one or more BS capabilities, one or more network parameters, or a neighboring cell list of the second wireless device. The determining process may comprise comparing at least one of the LAC or the CID, the one or more BS capabilities, the one or more network parameters, or the neighboring cell list of the second wireless devices with a set of LACs or a set of CIDs, a set of BS capabilities, a set of network parameters, or a neighboring cell list associated with the cluster of neighboring BSs, respectively. A fake BS may broadcast a system information (SI) message with an empty neighboring cell list or an invalid neighboring cell list. The first wireless device may scan a neighborhood for an discovery messages (e.g., system information (SI) messages for some systems such as 2G or GSM, beacon messages (for Wi-Fi), discovery reference signals (for LTE), etc.) broadcasted by the second wireless device and examine whether a valid neighboring cell list is included in the discovery message. When the second wireless device lacks a BS capability in the set of BS capabilities associated with the cluster of neighboring BSs, the one or more BS capabilities of the second wireless device may be determined to be inconsistent with the BS capabilities of the cluster of neighboring BSs. For example, it may be determined that a cluster of BSs are capable of providing a certain level of service (e.g., 4G service) that the advertising device is incapable of providing. A received signal power level and a life time of the discovery signal may be compared with a signal power threshold and a signal duration threshold as part of the determining process.

A noise level of the discovery signal may be compared with a noise level of one or more signals transmitted by one or more BSs in the cluster of neighboring BSs, for example in the absence of a fake BS. In an example, narrow noise signals in the operator licensed spectrum may be checked for. It may be detected that a communications session between a UE and a BS is downgraded from a Universal Mobile Telecommunications System (UMTS) connection to a Global System for Mobile Communications (GSM) connection, or that an encrypted communications session between a UE and a BS is downgraded to an unencrypted communications session or a weak encryption algorithm that can be easily attacked, and the downgrading may be input as a parameter for the determining process. The determining process may also comprise comparing a number of customer complaints received at a customer service center during a predefined period of time with an average number of customer complaints.

Figure 7:
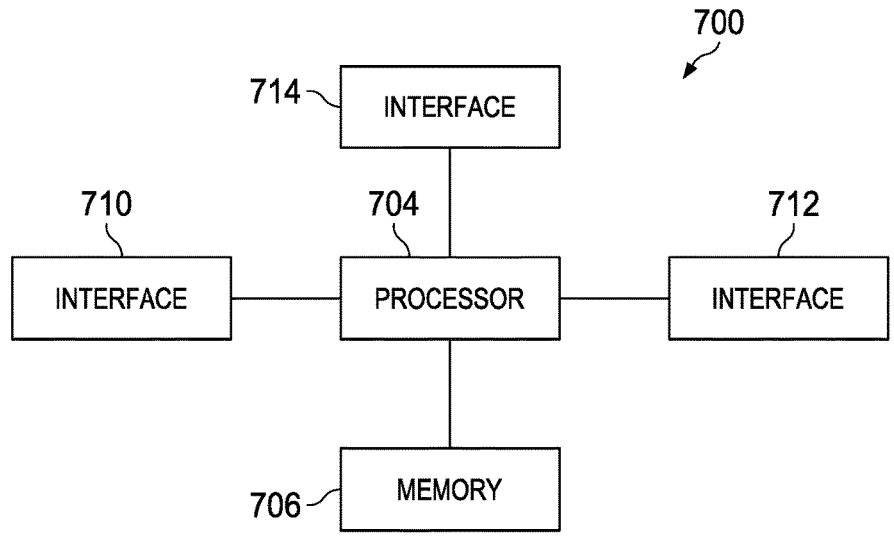
FIG. 7 illustrates a diagram of an embodiment processing system

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
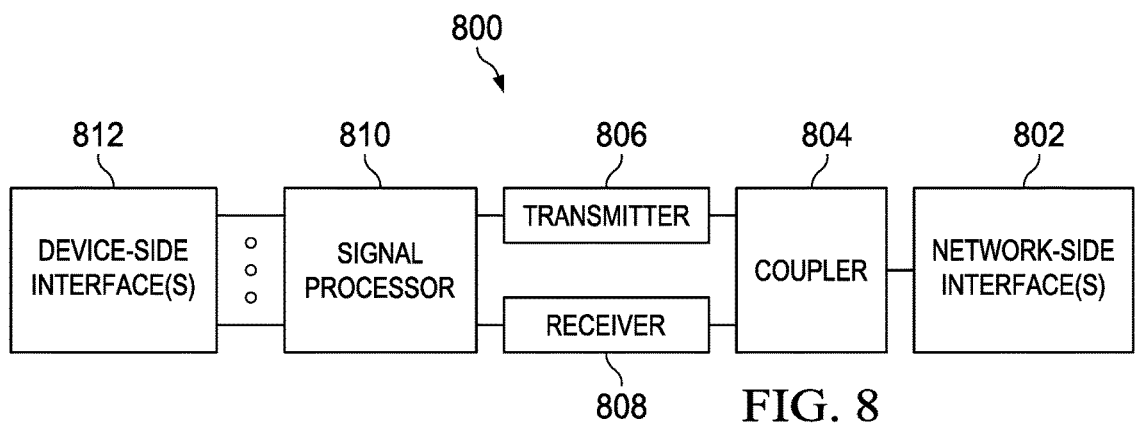
FIG. 8 illustrates a diagram of an embodiment transceiver.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 9:
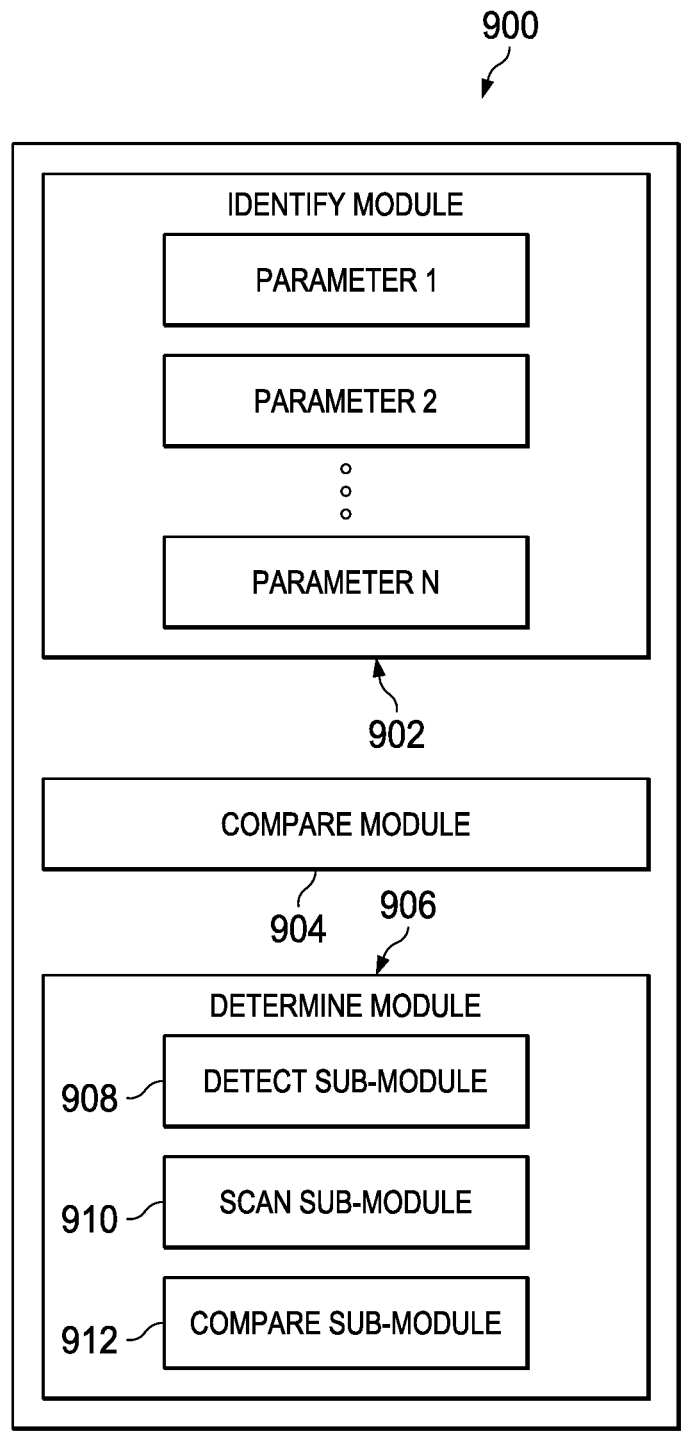
FIG. 9 illustrates a block diagram of an embodiment of a controller for detecting fake base stations.

FIG. 9 illustrates a block diagram of an embodiment controller 900 for detecting fake base stations. As shown, the controller 900 comprises an identify module 902, a compare module 904, and a determine module 906. The identify module 902 may be part of a first wireless device and may be configure to identify multiple parameters associated with a discovery signal transmitted by a second wireless device. The parameters may include a cell identifier (CID), a Location Area Code (LAC), a received power level (e.g., a Reference Signal Received Power (RSRP) level), a duration for which the discovery signal is detectable (eg., a lifetime), an encryption level of the discovery signal, a service level (e.g., 3G, 4G, etc.) advertised by the discovery signal, a frequency over which the discovery signal is received, a set of base station capabilities advertised by the discovery signal, and/or other parameters.

The second wireless device may advertise as a base station (BS). The compare module 904 may compare the multiple parameters associated with the discovery signal transmitted by the second wireless device with a set of parameters assigned to, or otherwise associated with, a cluster of neighboring BSs. The determine module 906 may further comprise a detect sub-module 908, a compare sub-module 912, and a scan sub-module 910. The determine module 906 may determine that the second wireless device is a fake BS when an inconsistency between the parameters associated with the discovery signal transmitted by the second wireless device and the set of parameters assigned to, or otherwise associated with, the cluster of neighboring BSs exceeds a threshold. The detect sub-module 908 may detect a noise level of the discovery signal transmitted by the second wireless device, and the compare sub-module 912 may compare the noise level of the discovery signal with a noise level of one or more signals transmitted by one or more BSs in the cluster of neighboring BSs in the absence of a fake BS. The scan sub-module 910 may scan a neighborhood for a system information (SI) message broadcasted by the second wireless device and examine whether a valid neighboring cell list is included in the SI message.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, an identifying unit/module, a comparing unit/module, and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for detecting fake base stations, the method comprising:
   identifying, by a first wireless device, multiple parameters associated with a discovery signal transmitted by a second wireless device, the second wireless device advertising as a base station controller (BS);
   comparing, by the first wireless device, the multiple parameters associated with the discovery signal transmitted by the second wireless device with a set of parameters assigned to, or otherwise associated with, a cluster of neighboring BSs; and
   determining that the second wireless device is a fake BS when an inconsistency between the parameters associated with the discovery signal transmitted by the second wireless device and the set of parameters assigned to, or otherwise associated with, the cluster of neighboring BSs exceeds a threshold.

2. The method of claim 1, wherein determining that the second wireless device is a fake BS comprises:
   comparing a frequency band over which the discovery signal is transmitted with a set of frequency bands assigned to, or otherwise associated with, the cluster of neighboring BSs.

3. The method of claim 1, wherein the discovery signal identifies a location area code (LAC) or a cell identifier (CID) of the second wireless device, and wherein determining that the second wireless device is a fake BS comprises:
   comparing the LAC or the CID of the second wireless device with a set of LACs or a set of CIDs assigned to, or otherwise associated with, the cluster of neighboring BSs, respectively.

4. The method of claim 1, wherein the discovery signal identifies one or more BS capabilities of the second wireless device, and wherein determining that the second wireless device is a fake BS comprises:
   comparing the one or more BS capabilities of the second wireless device with a set of BS capabilities associated with the cluster of neighboring BSs to determine whether or not the one or more BS capabilities of the second wireless device are inconsistent with BS capabilities of the cluster of neighboring BSs.

5. The method of claim 4, wherein the one or more BS capabilities of the second wireless device are inconsistent with the BS capabilities of the cluster of neighboring BSs when the second wireless device lacks a BS capability in the set of BS capabilities associated with the cluster of neighboring BSs.

6. The method of claim 1, wherein determining that the second wireless device is a fake BS comprises:
   comparing a network parameter identified in the discovery signal transmitted by the second wireless device with a set of network parameters associated with the cluster of neighboring BSs.

7. The method of claim 1, wherein determining that the second wireless device is a fake BS comprises:
   detecting a noise level of the discovery signal transmitted by the second wireless device; and
   comparing the noise level of the discovery signal with a noise level of one or more signals transmitted by one or more BSs in the cluster of neighboring BSs in the absence of a fake BS.

8. The method of claim 1, wherein determining that the second wireless device is a fake BS comprises:
   scanning a neighborhood for a system information (SI) message broadcasted by the second wireless device and examining whether a valid neighboring cell list is included in the SI message.

9. The method of claim 1, wherein the first wireless device is a base station, a user equipment, or a network-side device configured to detect fake BSs.

10. The method of claim 1, wherein determining that the second wireless device is a fake BS comprises:
    detecting that a communications session between a mobile station and a base station controller (BS) in a wireless network is downgraded from a long-term evolution (LTE) or a Universal Mobile Telecommunications System (UMTS) connection to a Global System for Mobile Communications (GSM) connection.

11. The method of claim 1, wherein determining that the second wireless device is a fake BS comprises:
   detecting that an encrypted communications session between a mobile station and a base station is downgraded to an unencrypted communications session or a weak encryption algorithm that can be easily attacked.

12. The method of claim 1, wherein determining that the second wireless device is a fake BS comprises:
   comparing both a received power level of the discovery signal and a lifetime of the discovery signal with a signal power threshold and a signal duration threshold, respectively, the lifetime of the discovery signal corresponding to a period of time for which the discovery signal is capable of being detected by the first wireless device.

13. The method of claim 1, wherein determining that the second wireless device is a fake BS comprises:
   comparing a number of customer complaints received at a customer service center during a predefined period of time with an average number of customer complaints.

14. A wireless communication device, comprising:
   a processor; and
   a non-transitory computer readable storage medium coupled to the processor and storing programming for execution by the processor, the programming including instructions to:
      identify multiple parameters associated with a discovery signal transmitted by a second wireless device, the second wireless device advertising as a base station (BS);
      compare the multiple parameters associated with the discovery signal transmitted by the second wireless device with a set of parameters assigned to, or otherwise associated with, a cluster of neighboring BSs; and
      determine that the second wireless device is a fake BS when an inconsistency between the parameters associated with the discovery signal transmitted by the second wireless device and the set of parameters assigned to, or otherwise associated with, the cluster of neighboring BSs exceeds a threshold.

15. The wireless communication device of claim 14, wherein the instructions to determine that the second wireless device is a fake BS include instructions to:
   compare a frequency band over which the discovery signal is transmitted with a set of frequency bands assigned to, or otherwise associated with, the cluster of neighboring BSs.

16. The wireless communication device of claim 14, wherein the discovery signal identifies a location area code (LAC) or a cell identifier (CID) of the second wireless device, and wherein the instructions to determine that the second wireless device is a fake BS include instructions to:
   Compare the LAC or the CID of the second wireless device with a set of LACs or a set of CIDs assigned to, or otherwise associated with, the cluster of neighboring BSs, respectively.

17. The wireless communication device of claim 14, wherein the discovery signal identifies one or more BS capabilities of the second wireless device, and wherein the instructions to determine that the second wireless device is a fake BS include instructions to:
   compare the one or more BS capabilities of the second wireless device with a set of BS capabilities associated with the cluster of neighboring BSs to determine whether or not the one or more BS capabilities of the second wireless device are inconsistent with BS capabilities of the cluster of neighboring BSs.

18. The wireless communication device of claim 17, wherein the one or more BS capabilities of the second wireless device are inconsistent with the BS capabilities of the cluster of neighboring BSs when the second wireless device lacks a BS capability in the set of BS capabilities associated with the cluster of neighboring BSs.

19. The wireless communication device of claim 14, wherein the instructions to determine that the second wireless device is a fake BS include instructions to:
   compare a network parameter identified in the discovery signal transmitted by the second wireless device with a set of network parameters associated with the cluster of neighboring BSs.

20. The wireless communication device of claim 14, and wherein the instructions to determine that the second wireless device is a fake BS include instructions to:
   detect a noise level of the discovery signal transmitted by the second wireless device; and
   compare the noise level of the discovery signal with a noise level of one or more signals transmitted by one or more BSs in the cluster of neighboring BSs in the absence of a fake BS.

21. A method for detecting fake base stations, the method comprising:
   detecting, by a first wireless device, a discovery signal of a second wireless device, the second wireless device advertising as a base station controller (BSC);
   determining, by the first wireless device, a power threshold and a minimum lifetime duration assigned to, or otherwise associated with, a cluster of neighboring BSCs; and
   determining that the second wireless device is a faked base station when both a received power level of the discovery signal exceeds the power threshold and a lifetime of the discovery signal fails to exceed the minimum lifetime duration, the lifetime of the discovery signal corresponding to a period of time for which the discovery signal is capable of being detected by the first wireless device.

22. The method of claim 21, wherein determining the minimum lifetime duration the power threshold and the minimum lifetime duration assigned to, or otherwise associated with, the cluster of neighboring BSCs comprises:
   receiving a control signal from a BSC in the cluster of BSCs, the control signal specifying the power threshold and the minimum lifetime duration.

23. The method of claim 21, wherein determining the minimum lifetime duration the power threshold and the minimum lifetime duration assigned to, or otherwise associated with, the cluster of neighboring BSCs comprises:
   detecting discovery signals of two or more BSCs in the cluster of BSCs;
   determining the minimum lifetime duration according to lifetimes of the discovery signals; and
   determining the power threshold according to received signal power levels of the discovery signals.

24. The method of claim 21, further comprising:
   determining that the second wireless device is not a faked base station when either the received power level of the discovery signal fails to exceed the power threshold or the lifetime of the discovery signal exceeds the minimum lifetime duration.

* * * * *